(12) United States Patent
Miki et al.

(10) Patent No.: US 7,464,538 B2
(45) Date of Patent: Dec. 16, 2008

(54) EXHAUST GAS PURIFYING APPARATUS (75) Inventors: Masanobu Miki, Wako (JP); Kenji Dosaka, Wako (JP); Keizo Iwama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 11/486,082

(22) Filed: Jul. 14, 2006

(65) Prior Publication Data
US 2007/0012029 A1 Jan. 18, 2007

(30) Foreign Application Priority Data
Jul. 14, 2005 (JP) ............................. 2005-205911

(51) Int. Cl.
*F01N 3/00* (2006.01)
(52) U.S. Cl. ............................. 60/275; 60/286; 60/295; 422/186.03; 422/186.14; 422/186.15
(58) Field of Classification Search ................ 60/274, 60/275, 277, 286, 295, 311, 285; 422/186.03, 422/186.11, 186.12, 186.14, 186.15, 186.13, 422/186.16
See application file for complete search history.

(56) References Cited
U.S. PATENT DOCUMENTS
5,655,210 A * 8/1997 Gregoire et al. ............. 422/186

| | | | |
|---|---|---|---|
| 6,269,631 B1 * | 8/2001 | Neff et al. | 60/274 |
| 6,321,531 B1 * | 11/2001 | Caren et al. | 60/275 |
| 6,363,714 B1 * | 4/2002 | Hoard et al. | 60/275 |
| 6,558,637 B2 * | 5/2003 | Tamura et al. | 422/186.04 |
| 2005/0063879 A1 * | 3/2005 | Tsuji | 422/174 |

FOREIGN PATENT DOCUMENTS

| | | |
|---|---|---|
| JP | 5-059934 A | 3/1993 |
| JP | 6-010652 A | 1/1994 |
| JP | 2001-046910 A | 2/2001 |

* cited by examiner

*Primary Examiner*—Binh Q. Tran
(74) *Attorney, Agent, or Firm*—Arent Fox LLP.

(57) ABSTRACT

In an exhaust gas purifying technique in which discharge is utilized, the invention provides a technique in which purification efficiency can be enhanced while an increase in electric power consumption is suppressed. A discharge mode including a discharge period and an undischarged period is adopted in a configuration in which a plasma process is performed to exhaust gas from a Diesel engine by generating the discharge in a plasma generator. A basic waveform periodically exists in a repeated manner in the discharge period, and the discharge is not performed in the undischarged period. An amplitude and/or a period of the basic waveform is controlled according to a load on the Diesel engine, a continuous iteration count of the basic waveform is controlled according to purification reaction efficiency in the plasma process, and the burst period is controlled according to an exhaust gas flow rate.

4 Claims, 6 Drawing Sheets

EXHAUST GAS PURIFYING APPARATUS

BACKGROUND OF THE INVENTION

1. Field of the Invention

The present invention relates to a technique of using a plasma generator to purify exhaust gas discharged from an internal combustion engine.

2. Description of the Related Art

There is proposed a method of using plasma for an exhaust gas purifying technique of a lean burn engine (mainly Diesel engine). The method of using the plasma is a technique in which electromagnetic energy is imparted to the exhaust gas by discharge to put the exhaust gas into a plasma state, and thereby decomposition reaction of toxic substances is promoted to generate a direct purification reaction or a purification reaction with a catalyst or the like (for example, see Japanese Patent Publication Laid-Open No. H6-10652).

Usually a method in which the alternating current discharge is utilized to generate the plasma, and there are proposed many techniques of controlling the plasma conditions improve purification efficiency (for example, see Japanese Patent Publication Laid-Open Nos. H5-59934 and 2001-46910).

Japanese Patent Publication Laid-Open No. H5-59934 discloses a configuration in which corona discharge is applied to the exhaust gas of the internal combustion engine to perform denitration. In the configuration, discharge voltage to an electrode which performs the corona discharge is controlled according to an operation condition of the internal combustion engine.

Japanese Patent Publication Laid-Open No. 2001-46910 discloses a technique of controlling an interval of the intermittent discharge corresponding to an exhaust gas flow rate in a configuration in which high alternating-current voltage is applied to the internal combustion engine exhaust gas to perform the intermittent discharge. These techniques are aimed at the improvement of exhaust gas purification efficiency and reduction of electric power consumption.

However, in the conventional techniques, there is a limitation to pursuance of the purification efficiency without largely increasing the electric power consumption. That is, the pursuance of the purification efficiency inevitably leads to the increase in electric power consumption.

SUMMARY OF THE INVENTION

In view of the foregoing, an object of the invention is to provide a technique of enhancing the purification efficiency while the increase in electric power consumption is suppressed in the technique of utilizing the discharge to purify the exhaust gas.

A first aspect of the invention is an exhaust gas purifying apparatus which purifies exhaust gas of an internal combustion engine, the exhaust gas purifying apparatus including a pair of discharge electrode which applies voltage to exhaust gas; voltage control means for controlling a waveform of voltage supplied to the discharge electrode; and detection means for detecting a load on an internal combustion engine, an exhaust gas flow rate, and purification reaction efficiency, wherein a waveform of the voltage has a burst period including a discharge period and an undischarged period, a predetermined basic waveform periodically existing in a repeated manner in the discharge period, the discharge being not performed in the undischarged period, and the voltage control means responds to output of the detection means to adjust an amplitude, a period, and a continuous iteration count of the basic waveform and a length of the burst period.

For example, the load on the internal combustion engine is detected by detecting the concentration of PM (Particulate Matter, for example, soot) included in the exhaust gas discharged from the internal combustion engine. In this case, it is determined that the high load is applied on the Diesel engine when the PM concentration is high, and it is determined that the low load is applied on the Diesel engine when the PM concentration is low. Alternatively, a method of detecting the exhaust gas concentration and a method of detecting a torque load on the internal combustion engine can be cited as an example of the method of detecting the load.

The purification reaction efficiency shall mean purification efficiency of the purifying target substance which is obtained as a result of the discharge to the exhaust gas. The PM removal efficiency can be cited as an example of the purification reaction efficiency.

Figure 1:
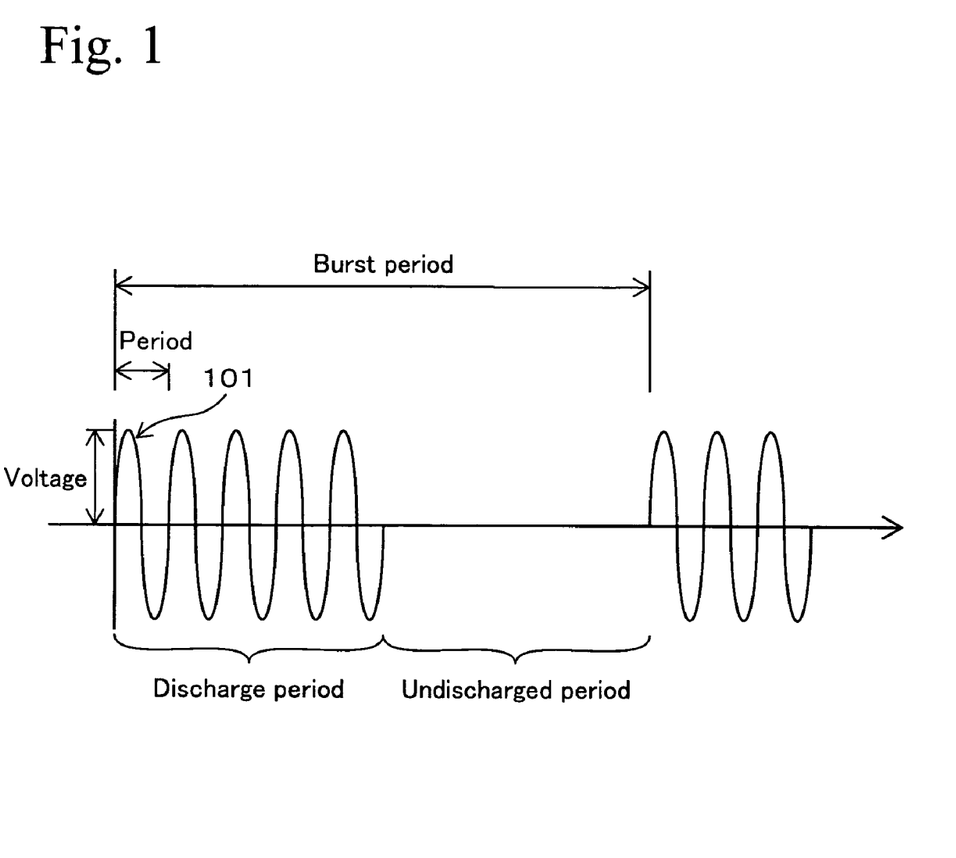
FIG. 1 is a conceptual view explaining a discharge waveform utilized in the invention.

The terminology used in the specification will be described below. The basic waveform shall mean a minimum unit of waveform which does not include two or more waveforms having periodicities in itself, and the basic waveform is defined by a one-period waveform having the periodicity such as a sine wave, a rectangular wave, a triangular wave, and a pulse wave. FIG. 1 is a conceptual view explaining the discharge waveform utilized. In FIG. 1, the basic waveform designated by the numeral 101 is illustrated as the minimum unit of waveform.

The discharge period shall mean a period during which the basic waveform is continuously repeated as a unit of one period. The undischarged period shall mean a period during which the discharge is not performed. For example, FIG. 1 shows the discharge period during which the iteration count of the basic waveform 101 is five times and the discharged period during which the iteration count is three times.

The burst period is defined by a period including the one-time discharge period and the subsequent undischarged period. A length ratio of the discharge period and the undischarged period can arbitrarily be adjusted. For example, in the state in which the burst period is fixed, when the discharge period is lengthened, the undischarged period is shortened. The basic waveform iteration count shall mean the number of times in which the one-period basic waveform is continuously repeated.

In the first aspect of the invention, the load on the internal combustion engine, the exhaust gas flow rate, and the purification reaction efficiency are detected, and the amplitude, the period, and the continuous iteration count of the basic waveform and the length of burst period are adjusted based on the detection values.

As described later, in the intermittent discharge in which the discharge period and the undischarged period are combined, the purification efficiency can be improved by increasing the discharge voltage (basic waveform amplitude). Furthermore, at this point, the purification efficiency can be enhanced while the increase in electric power consumption is suppressed by decrementing the basic waveform iteration count. That is, the discharge voltage is increased and the discharge period is shortened, which allows the purification efficiency to be enhanced without increasing the electric power consumption.

The increase in discharge voltage produces an effect of enhancing the instantaneous discharge energy to increase discharge density. A method of increasing an iteration frequency of the basic waveform (method of shortening the basic waveform period) can also be adopted as the method of enhancing the discharge density.

As described later, the purification efficiency of the toxic substance can be pursued while the electric power consumption is suppressed by optimizing the burst period.

Thus, the removal efficiency of the toxic substance in the exhaust gas is compatible with the suppression of the electric power consumption by adjusting the amplitude, the period, and the continuous iteration count of the basic waveform and the length of burst period.

A second aspect of the invention is an exhaust gas purifying apparatus which purifies exhaust gas of an internal combustion engine, the exhaust gas purifying apparatus including a pair of discharge electrode which applies voltage to exhaust gas; voltage control means for controlling a waveform of voltage supplied to the discharge electrode; and detection means for detecting a load on an internal combustion engine, an exhaust gas flow rate, and purification reaction efficiency, wherein a waveform of the voltage has a burst period including a discharge period and an undischarged period, a predetermined basic waveform periodically existing in a repeated manner in the discharge period, the discharge being not performed in the undischarged period, and the voltage control means controls: (1) an amplitude and/or a period of the basic waveform according to the load on the internal combustion engine; (2) a continuous iteration count of the basic waveform according to the purification reaction efficiency; and (3) the burst period according to the exhaust gas flow rate.

There are various parameters which have an influence on the purification efficiency. In the case where the purification efficiency is simply pursued, the input electric power is also increased according to the purification efficiency. According to the second aspect of the invention, the purification efficiency can be pursued while the increase in input electric power is suppressed by properly selecting the target which should be controlled according to the sensed physical value. That is, in the second aspect of the invention, when the load on the internal combustion engine is increased, the basic waveform amplitude is increased and/or the basic waveform period is shortened, and thereby the discharge energy density is increased. Therefore, the decrease in purification efficiency can be suppressed in association with the increase in load. When the load on the internal combustion engine is decreased, it is necessary that the basic waveform amplitude be decreased and/or the basic waveform period be lengthened.

The purification reaction efficiency is monitored, and the basic waveform iteration count is incremented when the purification reaction efficiency is decreased to a predetermined value. In this case, because the discharge period is lengthened in the burst period, the discharge is applied to the exhaust gas for a longer time. That is, when the purification reaction efficiency is decreased, the basic waveform iteration count is incremented to suppress the decrease in discharge efficiency. In this case, because the undischarged period during which the discharge is not performed exists after the discharge period during which the basic waveform is repeated, the purification efficiency can be secured while the input electric power is saved. When the purification efficiency exceeds a predetermined value, it is necessary to decrement the basic waveform iteration count.

The meaning that the basic waveform iteration count is adjusted according to the purification efficiency will be described below. The purification efficiency can also be enhanced by adjusting the voltage of the basic waveform. However, it is not proper to excessively increase the basic waveform due to a restriction of power supply voltage or a restriction of withstanding voltage of an oscillation system device. In the invention, a role is divided such that the basic waveform voltage is adjusted according to the loaded condition while the necessary reaction efficiency is adjusted by the basic waveform iteration count. Thus, in the restriction of the power supply voltage or the restriction of the withstanding voltage of the oscillation system device, the high purification efficiency can be obtained while the low electric power consumption is pursued.

The exhaust gas flow rate is monitored, and the burst period is shortened when the exhaust gas flow rate is increased. Therefore, the discharge electric power density per unit time can be increased to respond to the increase in exhaust gas flow rate. When the exhaust gas flow rate is decreased, it is necessary to lengthen the burst period.

For example, it is also possible to respond to the increase in exhaust gas flow rate by the method of increasing the discharge voltage, the method of increasing the iteration frequency of the basic waveform, and the method of incrementing the basic waveform iteration count. However, as described above, because there is the limitation to the increase in basic waveform voltage, it is not proper to increase the basic waveform voltage to respond to the increase in exhaust gas flow rate. Because the iteration frequency of the basic waveform is restricted by a composition and pressure of a discharge atmosphere from the need to stably perform the discharge, it is also not proper to increase the iteration frequency of the basic waveform according to the flow rate. Because the excessive increment of the basic waveform iteration count leads to the decrease in undischarged period, form the viewpoint of pursuance of the low electric power consumption, it is not preferable that the basic waveform iteration count be excessively incremented. Accordingly, it is preferable to change the burst period to deal with the increase in exhaust gas flow rate.

Thus, both the purification efficiency and the low electric power consumption can be pursued by limiting the parameter according to the sensed parameter.

Figure 2A:
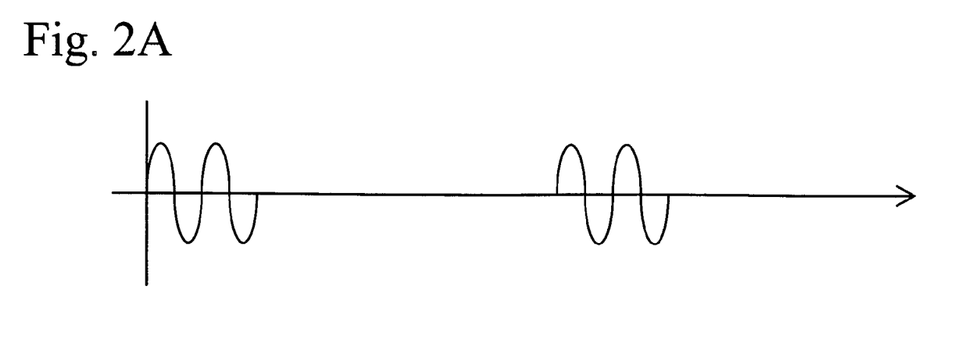
FIG. 2 is a conceptual view explaining types of the discharge waveform utilized in the invention.

An example of the discharge waveform used in the invention will briefly be described below. FIG. 2 is a conceptual view showing an example of the discharge waveform. FIG. 2A shows the basic waveform having the iteration count of twice.

For example, in the low loaded condition, it is assumed that the discharge is performed with the discharge waveform shown in FIG. 2A. In this state of things, it is assumed that the load is increased to increase the exhaust gas flow rate. For the increase in load, the control is performed such that the iteration frequency of the basic waveform is increased while the basic waveform voltage (amplitude) is increase. For the increase in exhaust gas flow rate, the control is performed such that the burst period is shortened.

Figure 2B:
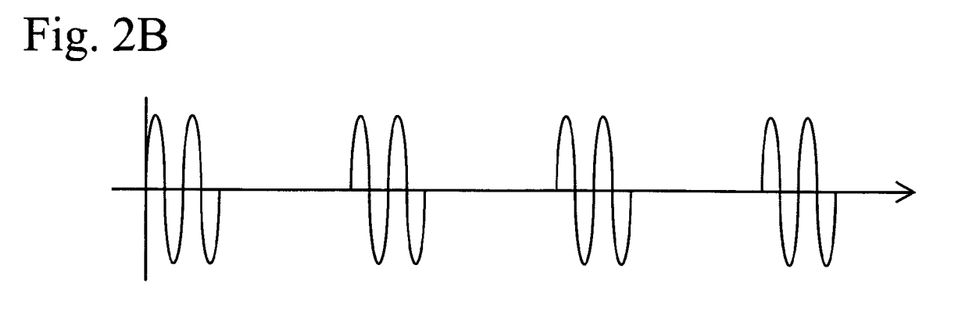

FIG. 2B shows an example of the discharge waveform after the control is performed to the discharge waveform shown in FIG. 2A. When compared with the discharge waveform shown in FIG. 2A, the discharge waveform shown in FIG. 2B is set such that the basic waveform voltage is increased while the basic waveform period is shortened. The burst period is also shortened.

Figure 2C:
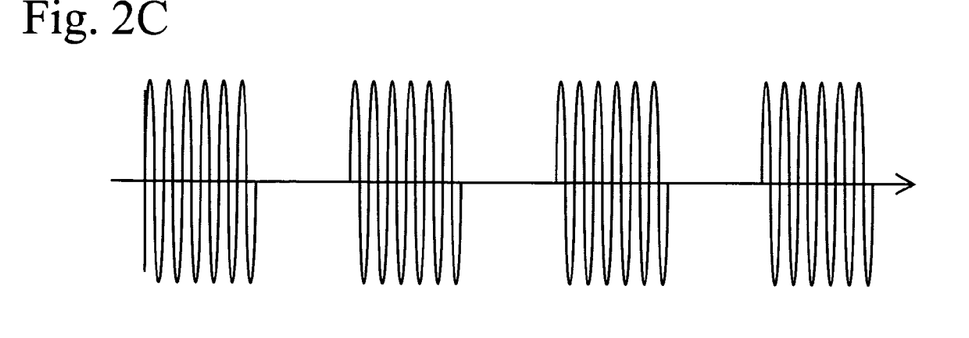

It is considered that the load is further increased from the state shown in FIG. 2B. In this case, the control is performed such that the iteration frequency of the basic waveform is further increased while the basic waveform voltage (amplitude) is further increase. FIG. 2C shows the discharge waveform which is outputted by performing the control. When compared with the discharge waveform shown in FIG. 2B, the discharge waveform shown in FIG. 2C is set such that the basic waveform voltage is increased while the basic waveform period is shortened.

In the first aspect or second aspect of the invention, an exhaust gas purifying apparatus may include electrode temperature detection means for detecting a temperature of the discharge electrode, wherein the voltage control means controls the continuous iteration count of the basic waveform and the burst period according to the temperature of the discharge electrode.

For example, when the continuous use of the plasma or excessive injection of the discharge energy is generated, the temperature of the discharge electrode is raised. When the temperature of the discharge electrode is raised, a rate of thermionic emission is increased, and there is a strong tendency to consume the discharge energy in the form of heat. Therefore, the removal efficiency of the toxic substance is decreased.

Accordingly, the discharge electrode temperature is monitored, and the continuous iteration count of the basic waveform is decremented and/or the burst period is lengthened when the temperature is raised with respect to the steady state. This enables the energy high-density state to be maintained in the discharge period. On the other hand, the undischarged period is relatively lengthened, and the lengthened undischarged period becomes a cooling period to suppress the temperature rise of the discharge electrode.

The temperature is raised in a space between the discharge electrodes as the temperature of the discharge electrode is raised. As a result, a difference in gas temperature between the pre-plasma process and the post-plasma process is increased compared with the steady state. For example, the method of detecting the temperature of the discharge space (plasma generation vessel) and the method of detecting the difference in gas temperature between the pre-plasma process and the post-plasma process can be cited as an example of the method of detecting the discharge electrode temperature.

The discharge electrode temperature can be actively controlled by utilizing this mode. For example, in the case where an exothermic reaction of a plasma reaction component is locally generated in a concentrated manner or in the case where the exhaust gas temperature is rapidly raised, the discharge electrode temperature is rapidly raised, and sometimes the discharge leads to an arc discharge. The arc discharge is not suitable to the exhaust gas purification, because plasma generation efficiency becomes worsened to induce the decrease in purification efficiency. In this case, the continuous iteration count of the basic waveform and the burst period are controlled according to the discharge electrode temperature, which allows the discharge electrode temperature to be adjusted at a predetermined appropriate temperature. This enables the electrode temperature suitable for the effective discharge to be set.

According to the invention, the removal efficiency of the toxic substance in the exhaust gas is compatible with the suppression of the electric power consumption by adjusting the amplitude, the period, and the continuous iteration count of the basic waveform and the length of burst period.

DESCRIPTION OF THE PREFERRED EMBODIMENT (1) Embodiment (Configuration of Embodiment)

An example in which an exhaust gas purifying apparatus according to the invention is applied to a system for removing PM (Particulate Matter, the soot is the target in this case) contained in the exhaust gas of the Diesel engine will be described below.

Figure 3:
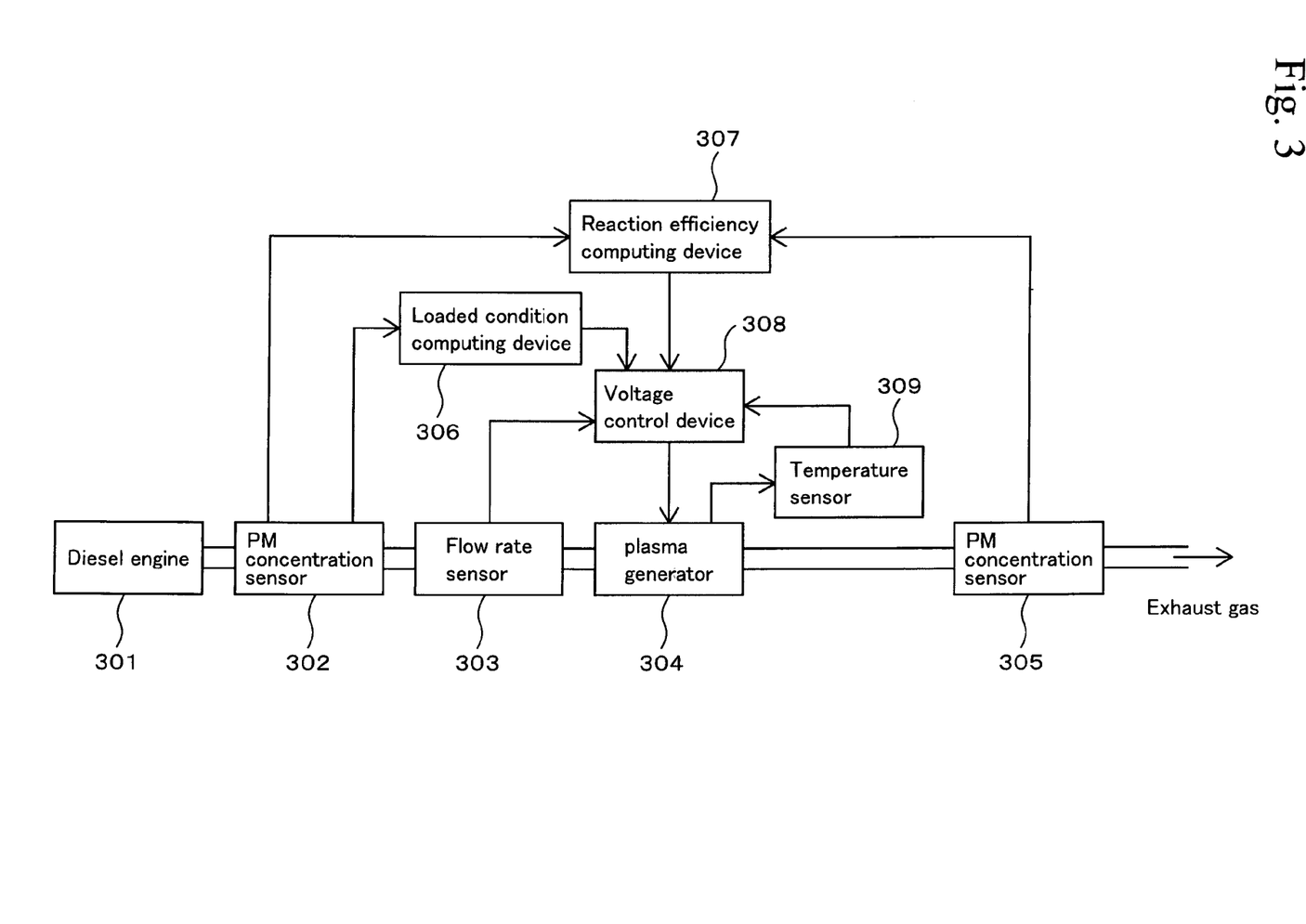
FIG. 3 is a block diagram showing an example of an exhaust gas purifying system in which the invention is utilized.

FIG. 3 is a block diagram showing an example of an exhaust gas purifying system in which the invention is utilized. A Diesel engine 301, a PM concentration sensor 302, a flow rate sensor 303, a plasma generator 304, a PM concentration sensor 305, a loaded condition computing device 306, a reaction efficiency computing device 307, a voltage control device 308, and a temperature sensor 309 are shown in FIG. 3.

An automobile engine, a truck engine, a bus engine, a railroad vehicle engine, a shipping engine, and a power generator engine can be cited as an example of Applications of the Diesel engine 301. In the embodiment, the exhaust gas discharged from the Diesel engine 301 flows sequentially through the PM concentration sensor 302, the flow rate sensor 303, the plasma generator 304, and the PM concentration sensor 305. The exhaust gas flowing out from the PM concentration sensor 305 is discharged to an environment through a catalyst converter or a silencer (not shown).

The PM concentration sensor 302 detects a PM concentration in the exhaust gas discharged from the Diesel engine 301 before the exhaust gas enters the plasma generator 304. The PM concentration sensor 302 sends the detection value of the PM concentration to the loaded condition computing device 306 and the reaction efficiency computing device 307. The flow rate sensor 303 detects a flow rate of the exhaust gas discharged from the Diesel engine 301, and the flow rate sensor 303 sends the detection value of the exhaust gas flow rate to the voltage control device 308.

Figure 4:
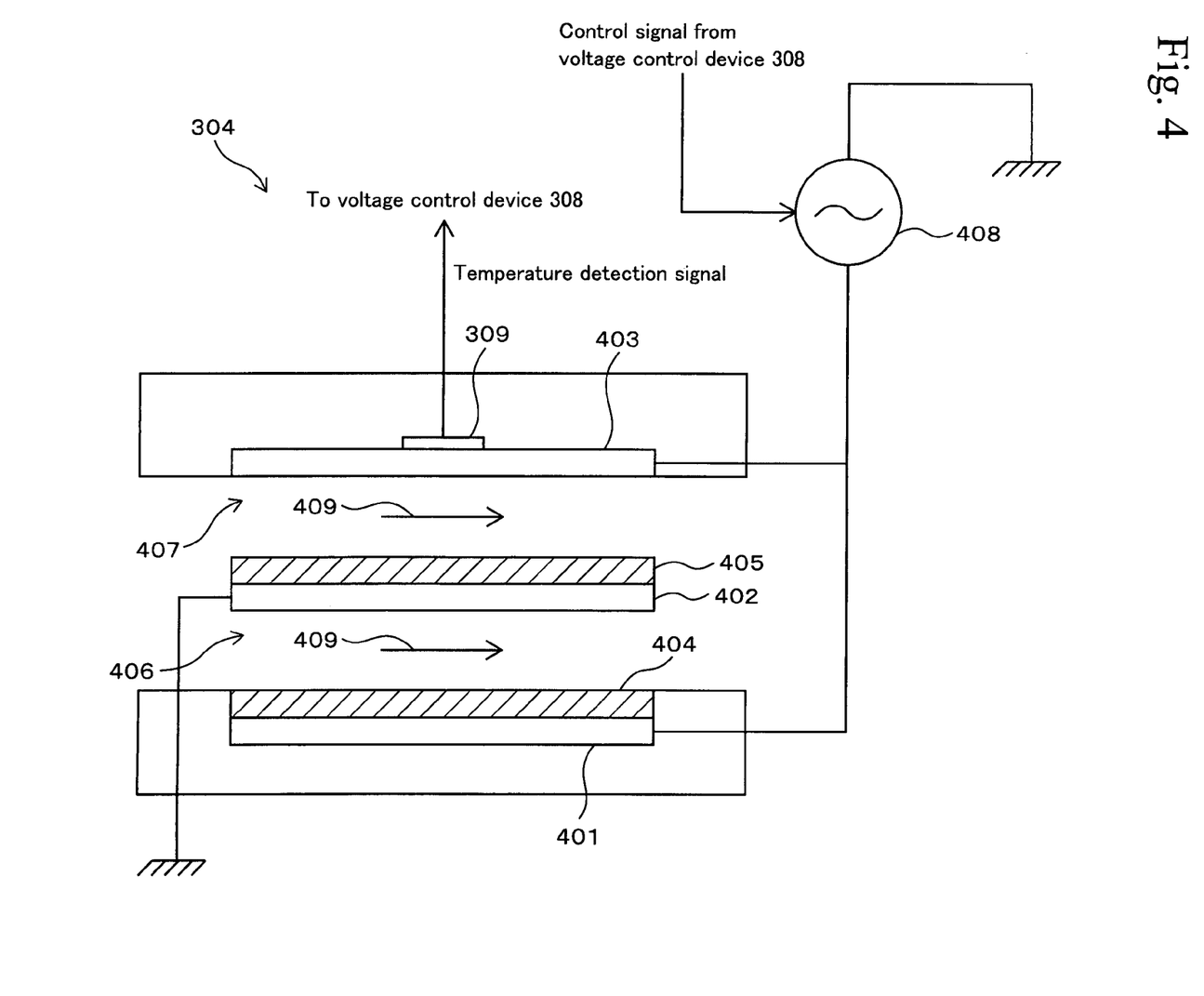
FIG. 4 is a conceptual view showing an example of a plasma generator.

The plasma generator 304 has a basic structure shown in FIG. 4, the plasma generator 304 performs the discharge to the exhaust gas to put the exhaust gas into the plasma state, and the plasma generator 304 decomposes PM to purify the exhaust gas. In the action of the embodiment, the exhaust gas is put into the ionized state or activated state, and the soot included in the exhaust gas is changed to carbon monoxide or carbon dioxide. Therefore, the soot existing in the exhaust gas can be purified.

The plasma generator 304 is controlled by the voltage control device 308. The voltage control device 308 controls a discharge voltage (basic waveform amplitude), an iteration count of a basic waveform, a basic waveform period (iteration frequency) and a burst period. The PM concentration sensor 305 detects the PM concentration in the exhaust gas which passes through the plasma generator, and the PM concentration sensor 305 sends the detection value of the PM concentration to the reaction efficiency computing device 307.

The loaded condition computing device 306 computes a loaded condition of the Diesel engine 301 based on the PM concentration detected by the PM concentration sensor 302.

At this point, it is determined that the high load is applied on the Diesel engine 301 when the PM concentration is high, and it is determined that the low load is applied on the Diesel engine 301 when the PM concentration is low. The loaded condition computing device 306 includes a memory in which a data table is stored. A relationship between the PM concentration and the loaded condition is determined by the data table. The loaded condition is computed from the detected PM concentration using the data table.

The reaction efficiency computing device 307 compares the PM measurement value of the PM concentration sensor 302 and the PM measurement value of the PM concentration sensor 305 to compute PM purification efficiency in the plasma generator 304. The reaction efficiency computing device 307 sends the computation result to the plasma generator 304.

The voltage control device 308 controls discharge conditions of the plasma generator 304. The voltage control device 308 performs the controls based on the loaded condition computed by the loaded condition computing device 306, the reaction efficiency computed by the reaction efficiency computing device 307, the exhaust gas flow rate outputted from the flow rate sensor 303, and electrode temperature detected by the temperature sensor 309. Contents of the control will be described later.

The voltage control device 308 includes CPU (not shown), a memory (not shown), and an interface (not shown). CPU controls the operation of the later-described contents. A program and various kinds of data are stored in the memory. The interface conducts communication with other devices. The program for determining a processing procedure in the control and the data necessary for the various kinds of control are stored in the memory. That is, the data table for determining the relationship among the loaded condition (or PM concentration), the discharge voltage, and the discharge period, the data table for determining the relationship between the reaction efficiency and the iteration count of the basic discharge waveform, the data table for determining the relationship between the exhaust gas flow rate and the burst period, the data table for determining the relationship among the electrode temperature, the burst period, and the iteration count of the basic discharge waveform are stored in the memory of the voltage control device 308. The data contents in which the optimum combinations are previously determined by experiments are used as the contents of the data table.

The temperature sensor 309 detects the electrode temperature of the plasma generator 304, and the temperature sensor 309 sends the detected data to the voltage control device 308. In the embodiment, the temperature sensor 309 detects the temperature of one of the discharge electrodes as the electrode temperature of the discharge electrode.

FIG. 4 is a conceptual view showing an outline of the plasma generator 304 of FIG. 3. The plasma generator 304 shown in FIG. 4 includes a positive electrode 401, a negative electrode 402, a positive electrode 403, alumina plates 404 and 405, discharge spaces 406 and 407, a voltage generator 408, and the temperature sensor 309.

In the plasma generator 304, the pair of positive electrodes 401 and 403 is arranged so as to sandwich the negative electrode 402. The negative electrode 402 is connected to a ground potential, and the positive electrodes 401 and 403 are connected to the voltage generator 408.

The discharges are generated in a discharge space 406 between the positive electrode 401 and the negative electrode 402 and in a discharge space 407 between the positive electrode 403 and the negative electrode 402. The exhaust gas flows in the discharge spaces 406 and 407 toward a direction shown by arrows 409, and the discharge is imparted to the exhaust gas in the discharge spaces 406 and 407. PM (in this case, the target is the soot) included in the exhaust gas is decomposed to purify PM by imparting the discharge to the exhaust gas.

The alumina plates 404 and 405 are arranged over a surface of the positive electrode 401 facing the discharge space 406 and over a surface of the negative electrode 402 facing the discharge space 407 respectively. An abnormal discharge such as an arc discharge can be prevented to realize the stable discharge by arranging the dielectric material such as alumina over the surface on the discharge space side of the electrode.

The voltage generator 408 is controlled by the voltage control device 308. In the embodiment, the voltage generator 408 generates the later-described voltage waveform to supply the voltage waveform to the discharge electrode (positive electrode 401 and negative electrode 402). The target to be controlled includes the amplitude and period (frequency) of the basic waveform, a continuous iteration count of the basic waveform, and the burst period. The temperature sensor 309 detects the temperature of the positive electrode 403, and the temperature sensor 309 sends the detection signal to the voltage control device 308.

(Operation of Embodiment)

Figure 5:
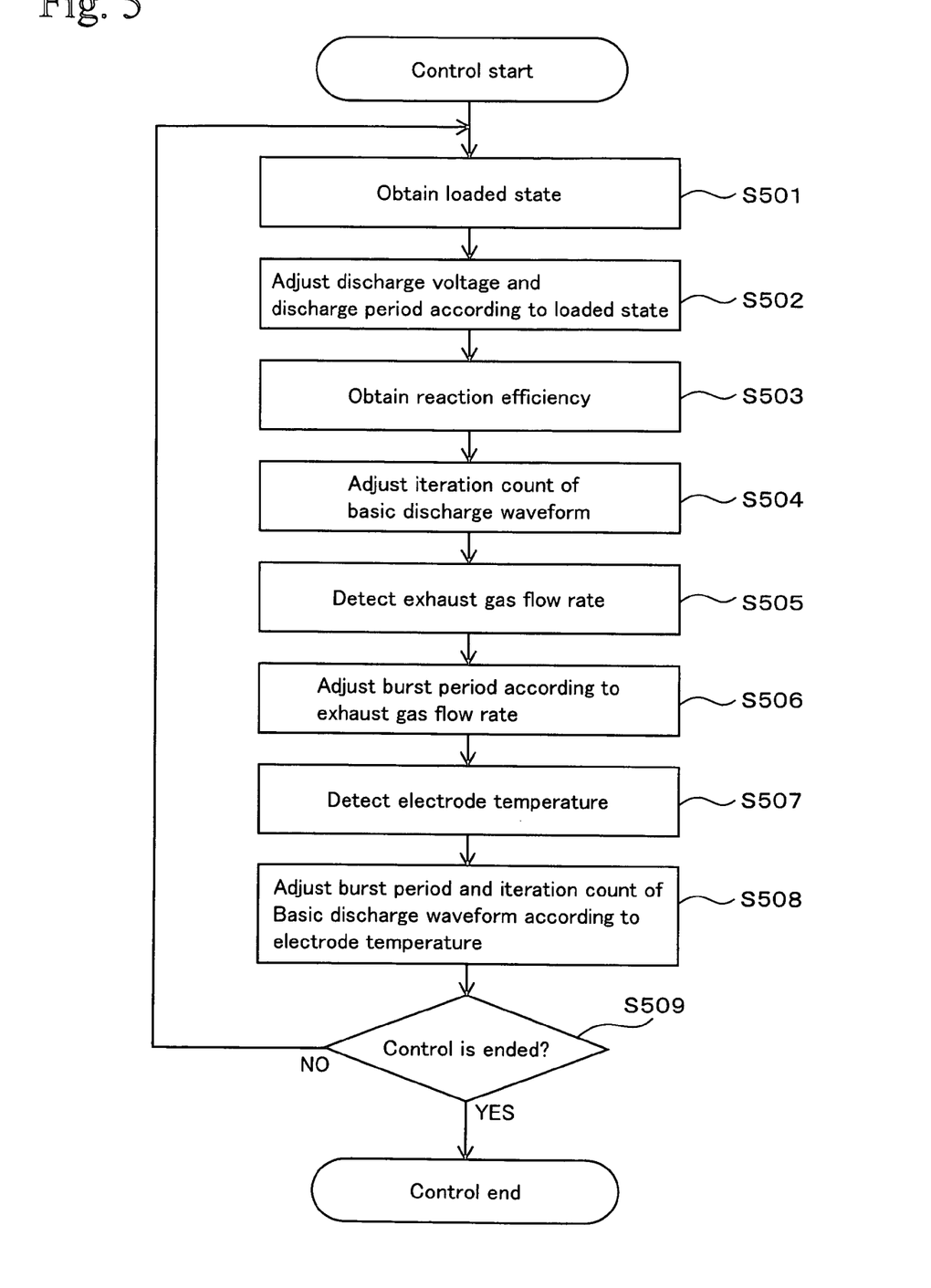
FIG. 5 is a flowchart showing an operation example of the exhaust gas purifying system shown in FIG. 3.

FIG. 5 is a flowchart showing an operation example of the exhaust gas purifying system shown in FIG. 3. When the control of the plasma generator 304 is started, the loaded condition of the Diesel engine 301 is obtained (Step S501). In the embodiment, the PM concentration included in the exhaust gas of the Diesel engine 301 is measured by the PM concentration sensor 302, and the loaded condition is computed based on the measurement value of the PM concentration. In this case, the loaded condition is obtained such that the high load is applied on the Diesel engine 301 when the PM concentration is high and the low load is applied on the Diesel engine 301 when the PM concentration is low.

When the loaded condition is obtained, the data table stored in the memory of the voltage control device 308 is referred to, and the discharge voltage and the discharge period are read according to the loaded condition detected in Step S501. The signals indicating the read discharge voltage and discharge period are sent from the voltage control device 308 to the plasma generator 304. Thus, the discharge voltage and the discharge period are adjusted according to the loaded condition (Step S502).

In Step S502, in the case of the large load (in the case of the high PM concentration), the control is performed such that the discharge voltage is increased to shorten the discharge period (discharge period of basic waveform).

Then, the reaction efficiency in the plasma generator 304 is obtained (Step S503). The reaction efficiency computing device 307 compares the detection values of the PM concentrations of the PM concentration sensors 302 and 305 to obtain the reaction efficiency. At this point, the reaction efficiency is increased as the PM concentration detected by the PM concentration sensor 305 becomes lower compared with the PM concentration detected by the PM concentration sensor 302. The basic discharge waveform iteration count corresponding to the obtained reaction efficiency is read from the memory, and the signal indicating the basic discharge waveform iteration count is sent from the voltage control device 308 to the plasma generator 304. Thus, the basic discharge waveform iteration count is adjusted based on the reaction efficiency (Step S504).

Then, the exhaust gas flow rate is detected with the flow rate sensor 303 (Step S505). The burst period is read from the memory in the voltage control device 308 according to the detected exhaust gas flow rate, and the signal indicating the burst period is sent from the voltage control device 308 to the plasma generator 304. Thus, the burst period is adjusted according to the exhaust gas flow rate (Step S506).

In Step S506, the adjustment is performed such that the burst period is shortened when the exhaust gas flow rate is increased while the burst period is lengthened when the exhaust gas flow rate is decreased.

The temperature of the positive electrode 403 is detected with the temperature sensor 309 (Step S506), and the burst period and the basic discharge iteration count are adjusted based on the detected temperature (Step S507). At this point, in the case the electrode temperature is raised, the adjustment is performed such that the burst period is lengthened while the basic discharge iteration count is decreased. In the case the electrode temperature is decreased, the reverse adjustment is performed.

It is determined whether or not the control is ended (Step S508). When the control is ended, the operation is ended. When the control is not ended, the flow returns to Step S501.

(2) Experimental Result

In the case where the invention is utilized for removing PM (soot in this case) from the exhaust gas, the result that examines the effect will be described below. In this case, the data is collected with the system shown in FIG. 3.

The conditions on which the data is obtained are as follows. A water-cooled four-cycle Diesel (three cylinders) is used as the Diesel engine 301. In the water-cooled four-cycle Diesel, a total displacement is 1061 cm$^3$, use fuel is Diesel light oil, and rated power is 12 kVA.

The amount of PM in the exhaust gas is measured by a gravimetric method in which PM is collected by a filter (not shown). That is, a predetermined amount of exhaust gas is sampled to collect PM with a commercially available filter (0.3 μm mesh), and a difference in weight before and after the collection is set at the PM weight.

In this case, the positive electrodes 401 and 404 and the negative electrode 402 for formed by a stainless plate having a thickness of 1.0 mm and a size of 20 mm by 50 mm. The alumina plates 404 and 405 have the thickness of 0.5 mm. The space between the alumina plate 404 and the negative electrode 402 and the space between the alumina plate 405 and the positive electrode 403 are set at 0.5 mm respectively.

The exhaust gas flow rate flowing in the plasma generator 304 is set at 8.5 L/min, and the exhaust gas temperature is adjusted at 214° C. by a heater (not shown). The discharge waveform shown in FIG. 1 is set at the burst waveform having the basic waveform of 3000 Hz. Two kinds of voltage values of 6.6 kVp-p and 7.0 kVp-p are used as the basic waveform voltage.

EXAMPLE 1

The basic waveform is set at a 6.6-kVp-P sine wave (3000 Hz), the basic waveform iteration count is set at twice, and the burst period is set at 300 Hz. In this case, the electric power consumption is 4.7 W. In the above conditions, the burst period has the length equal to the ten periods of the basic waveform. Therefore, the undischarged periods of eight basic discharge waveforms 8 remain after the discharge period during which the basic waveform is repeated twice.

EXAMPLE 2

The basic waveform is set at a 7.0-kVp-P sine wave (3000 Hz), the basic waveform iteration count is set at once, and the burst period is set at 300 Hz. In this case, the electric power consumption is 4.5 W.

EXAMPLE 3

The basic waveform is set at the 7.0-kVp-P sine wave (3000 Hz), the basic waveform iteration count is set at twice, and the burst period is set at 300 Hz. In this case, the electric power consumption is 5.3 W.

EXAMPLE 4

The basic waveform is set at the 7.0-kVp-P sine wave (3000 Hz), the basic waveform iteration count is set at three times, and the burst period is set at 300 Hz. In this case, the electric power consumption is 8.7 W.

EXAMPLE 5

The basic waveform is set at the 7.0-kVp-P sine wave (3000 Hz), the basic waveform iteration count is set at twice, and the burst period is set at 150 Hz. In this case, the electric power consumption is 2.6 W.

EXAMPLE 6

The basic waveform is set at the 7.0-kVp-P sine wave (3000 Hz), the basic waveform iteration count is set at twice, and the burst period is set at 600 Hz. In this case, the electric power consumption is 10.6 W.

COMPARATIVE EXAMPLE

The continuous waveform discharge is performed by continuously applying a 6.6-kVp-P sine wave (300 Hz). In this case, the electric power consumption is 5.8 W. Table 1 shows the summary of the conditions, the electric power consumption, and the PM purification ratio of Examples and Comparative Example.

TABLE 1

|  | Example 1 | Example 2 | Example 3 | Example 4 | Example 5 | Example 6 | Comparative Example |
|---|---|---|---|---|---|---|---|
| Basic waveform voltage (kVp-p) | 6.6 | 7.0 | 7.0 | 7.0 | 7.0 | 7.0 | 6.6 |
| Basic waveform frequency | 3000 Hz | 3000 Hz | 3000 Hz | 3000 Hz | 3000 Hz | 3000 Hz | 300 Hz |

TABLE 1-continued

| | Example 1 | Example 2 | Example 3 | Example 4 | Example 5 | Example 6 | Comparative Example |
|---|---|---|---|---|---|---|---|
| Basic waveform iteration count | twice | one | twice | Three times | twice | twice | (continuous) |
| Burst period | 300 Hz | 300 Hz | 300 Hz | 300 Hz | 150 Hz | 600 Hz | (continuous) |
| Electric power consumption | 4.7 W | 4.5 W | 5.3 W | 8.7 W | 2.6 W | 10.6 W | 5.8 W |
| PM purification ratio | about 75% | about 83% | about 88% | about 92% | about 67% | about 86% | about 50% |

Figure 6:
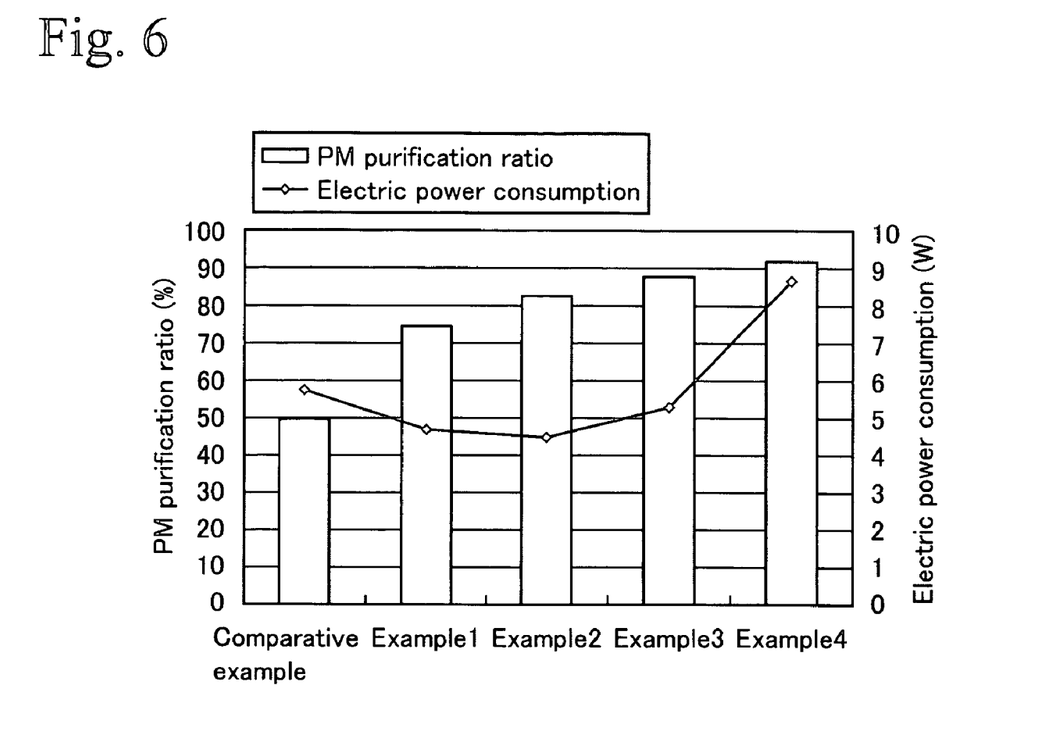
FIG. 6 shows data of a PM purification ratio in each example.
Figure 7:
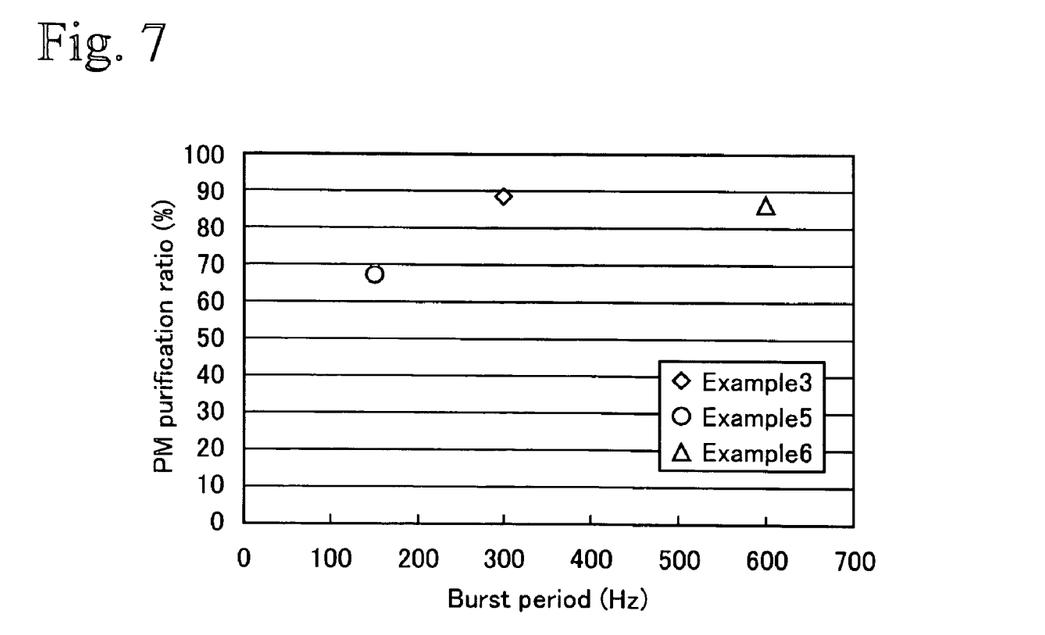
FIG. 7 is a data plot showing a relationship between a burst period and the PM purification ratio.

FIG. 6 shows relationship between the PM purification ratio and electric power consumption in Examples 1 to 4 and Comparative Example. FIG. 7 is a data plot showing a relationship between the burst period and the PM purification ratio in Examples 3, 5, and 6. The PM purification ratio is a ratio (in terms of weight) of PM which is decreased by causing the exhaust gas to pass through the plasma generator 407. Assuming that the amount of PM included in the exhaust gas is set at a pre-plasma process PM amount before the exhaust gas passes through the plasma generator 407 while the amount of PM included in the exhaust gas is set at a post-plasma process PM amount after the exhaust gas passes through the plasma generator 407, the PM purification ratio is computed by PM purification ratio=100×((pre-plasma process PM amount−post-plasma process PM amount)/pre-plasma process PM amount).

Referring to FIG. 6, the PM purification ratio is about 75% in Example 1 while the PM purification ratio is about 50% in Comparative Example, and the electric power consumption is 4.7 W in Example 1 while the electric power consumption is 5.8 W. That is, although Example 1 has the low electric power consumption compared with Comparative Example, Example 1 can obtain the higher PM purification ratio.

The difference is attributed to the fact that the intermittent discharge, in which the 3000-Hz basic waveform is repeated twice and then the eight undischarged periods remain, is performed in Example 1 while the 300-Hz basic waveform is continuously oscillated in Comparative Example. It is seen from the above fact that the PM purification can efficiently be performed when the basic waveform frequency is increased to set the undischarged period. In the electric power consuming method, the high-density discharge is performed by combining the basic waveform having the high discharge energy and the undischarged period rather than the electric power is consumed by the continuous basic waveform having the low discharge energy, which allows the efficiency to be increased in the PM purification. That is, the PM purification efficiency can be increased by instantaneously applying the high energy rather than evenly applying the energy.

When compared with Comparative Example, the PM purification ratio is increased although the electric power consumption is small in Example 1. This means that the PM purification ratio of the intermittent discharge is higher than that of the continuous discharge under the same conditions.

The PM purification ratio is about 83% in Example 2 while the PM purification ratio is about 50% in Comparative Example, and the electric power consumption is 4.5 W in Example 1 while the electric power consumption is 5.8 W.

Compared with the difference between Examples 1 and 2, not only the electric power consumption is smaller but also the PM purification ratio is larger in Example 2. Example 1 differs from Example 2 in that the basic waveform voltage is 7.0 kVp-p (6.6 kVp-p in Example 1) while the basic waveform iteration count is once in Example 2 (twice in Example 1). That is, in Example 2, the basic waveform voltage is increased by 6% compared with Example 1, and the basic waveform iteration count is decremented from twice to once.

Examples 1 and 2 have the same burst period of 300 Hz. However, in Example 2, the PM purification ratio can be increased while the basic waveform iteration count is decremented. This is attributed to the effect that basic waveform voltage is increased by 6%.

Consequently, it can be concluded that increasing the basic waveform voltage to simultaneously decrease the basic waveform iteration count is effective method of enhancing the PM purification ratio without increasing the electric power consumption under the condition in which the exhaust gas flow rate is kept constant. That is, the PM purification ratio and the low electric power consumption can be pursued by adjusting the basic waveform amplitude and the basic waveform iteration count.

Then, Examples 2 to 4 will be compared to one another. Examples 2 to 4 differ from one another in the condition of the basic waveform iteration count. As can be seen from FIG. 6, the PM purification ratio is increased as the basic waveform iteration count is incremented. However, an increase rate of the electric power consumption is larger than an increase rate of the PM purification ratio.

Then, Examples 3, 5, and 6 will be compared to one another. Examples 3, 5, and 6 differ from one another in the burst period. The burst period is (1/300) second (300 Hz) in Example 3, the burst period is (1/150) second (150 Hz) in Comparative Example 5, and the burst period is (1/600) second (600 Hz) in Comparative Example 6.

As can be seen from FIG. 7, the PM purification ratio is decreased when the burst period is shortened to some extent (when time is lengthened in the case where the burst period is expressed by time). As can be seen from the comparison of the Example 3 with Example 6, the burst period has the optimum range in the case where the PM purification ratio and the low electric power consumption are pursued. That is, the number of discharge periods (determined by the basic waveform, the basic waveform period, and the basic waveform iteration count) is determined by setting the burst period. On the other hand, in the case where the actual exhaust gas flow rate is excessive for the exhaust gas flow rate which can be processed during one discharge period, several discharge periods to be generated are required during the exhaust gas passes through the reactor. For example, the desired number of discharge periods is computed based on (actual exhaust gas flow rate/ exhaust gas flow rate which can be processed during one discharge period). Accordingly, the burst period is adjusted according to the flow rate of the exhaust gas entering the reactor, so that the optimum number of discharge periods can be set according to the exhaust gas flow rate, and the PM purification ratio and the low electric power consumption can be pursued.

As can be seen from the above demonstration data, in the intermittent discharge mode in which the discharge and the no-yet discharged are alternately repeated, by adjusting the basic discharge waveform voltage, the basic discharge waveform iteration count, and the burst period, the purification efficiency in the plasma reaction can be enhance while the electric power consumption is suppressed.

The invention can be applied to the purification of the exhaust gas discharged from the automobile lean burn engine, the purification of the smoke exhaust discharged from the internal combustion engine installed in the shipping, and the purification of the smoke exhaust discharged from the internal combustion engine of the power generator or the like.

What is claimed is:

1. An exhaust gas purifying apparatus which purifies exhaust gas of an internal combustion engine, the exhaust gas purifying apparatus comprising:
   a pair of discharge electrodes which applies voltage to exhaust gas;
   voltage control means for controlling a waveform of voltage supplied to the pair of discharge electrodes; and
   detection means for detecting a load on an internal combustion engine, an exhaust gas flow rate, and purification reaction efficiency,
   wherein a waveform of the voltage has a burst period that is repeatedly performed, the burst period includes a discharge period and an undischarged period subsequent to the discharge period, a predetermined basic waveform periodically existing in a repeated manner in the discharge period, the predetermined basic waveform being not included and a discharge voltage being zero in the undischarged period, and the voltage control means responds to output of the detection means to adjust an amplitude, a period, and a continuous iteration count of the basic waveform and a length of the burst period.

2. An exhaust gas purifying apparatus which purifies exhaust gas of an internal combustion engine, the exhaust gas purifying apparatus comprising:
   a pair of discharge electrodes which applies voltage to exhaust gas;
   voltage control means for controlling a waveform of voltage supplied to the pair of discharge electrodes; and
   detection means for detecting a load on an internal combustion engine, an exhaust gas flow rate, and purification reaction efficiency,
   wherein a waveform of the voltage has a burst period that is repeatedly performed, the burst period includes a discharge period and an undischarged period subsequent to the discharge period, a predetermined basic waveform periodically existing in a repeated manner in the discharge period, the predetermined basic waveform being not included and a discharge voltage being zero in the undischarged period, and the voltage control means controls:
   (1) an amplitude and/or a period of the basic waveform according to the load on the internal combustion engine;
   (2) a continuous iteration count of the basic waveform according to the purification reaction efficiency; and
   (3) the burst period according to the exhaust gas flow rate.

3. The exhaust gas purifying apparatus according to claim 1, further comprising electrode temperature detection means for detecting a temperature of the discharge electrodes,
   wherein the voltage control means controls the continuous iteration count of the basic waveform and the burst period according to the temperature of the discharge electrodes.

4. The exhaust gas purifying apparatus according to claim 2, further comprising electrode temperature detection means for detecting a temperature of the discharge electrodes,
   wherein the voltage control means controls the continuous iteration count of the basic waveform and the burst period according to the temperature of the discharge electrodes.

* * * * *